US012539252B2

(12) United States Patent
Raccah

(10) Patent No.: US 12,539,252 B2
(45) Date of Patent: Feb. 3, 2026

(54) PERSONAL MASSAGER

(71) Applicant: VVOLE LLC, Sun Valley, CA (US)

(72) Inventor: Avraham Raccah, Sun Valley, CA (US)

( * ) Notice: Subject to any disclaimer, the term of this patent is extended or adjusted under 35 U.S.C. 154(b) by 1135 days.

(21) Appl. No.: 17/512,255

(22) Filed: Oct. 27, 2021

(65) Prior Publication Data

US 2023/0127737 A1 Apr. 27, 2023

(51) Int. Cl.
*A61H 19/00* (2006.01)
*A61H 23/02* (2006.01)

(52) U.S. Cl.
CPC ............. *A61H 19/44* (2013.01); *A61H 23/02* (2013.01); *A61H 2201/169* (2013.01); *A61H 2201/5007* (2013.01)

(58) Field of Classification Search
CPC ................................ A61H 19/44; A61H 21/00
See application file for complete search history.

(56) References Cited

U.S. PATENT DOCUMENTS

2008/0269553 A1* 10/2008 Nan ....................... A61H 19/34 600/38
2012/0116273 A1* 5/2012 Nan ................... A61H 23/0263 601/46
2014/0066925 A1* 3/2014 Howard ................. A61H 23/00 606/38
2016/0175186 A1* 6/2016 Shadduck .............. A61H 19/34 601/15
2020/0367816 A1* 11/2020 Panneer Selvam .. A61B 5/7475
2022/0105281 A1* 4/2022 Gulesserian ........... A61H 21/00

FOREIGN PATENT DOCUMENTS

GB 2457779 A * 9/2009 ............. A61H 19/40
WO WO-2022195138 A1 * 9/2022 ............. A61H 19/00

OTHER PUBLICATIONS https://www.amazon.com/Adult-Toys-Evolved-Helping-Hand/dp/B09BC3N323/ref=sr_1_2?dchild=1&keywords=evolved+helping+hand&qid=1632176370&s=hpc&sr=1-2. Accessed Nov. 1, 2021.
https://www.womenshealthmag.com/sex-and-love/g29894498/best-finger-vibrators/?slide=12. Accessed Nov. 1, 2021.
https://calexotics.com/mini-marvels-marvelous-tickler-9-50-3-blue.html.
https://adultomg.com/product/frisky-finger-it-10x-silicone-rechargeable-g-spot-pleaser-vibrator-purple/.
https://www.adameve.com/adult-sex-toys/vibrators/finger-vibrators-c-1484.aspx?&cm_mmc=GGL-_-Vibrators_US_NB_Google_Exact-_-Fingertip_Vibrators_Exact-_-finger+vibrator&sc=SEMGLVIB&medium=tsa&gclid=EAIaIQobChMI77aY1--m8wIViN7ICh2ywQjdEAAYASAAEgLqVvD_BwE&gclsrc=aw.ds.
https://www.adameve.com/vibrators/finger-vibrators/sp-mini-marvels-marvelous-tickler-finger-vibe-107497.aspx.
https://www.adameve.com/adult-sex-toys/vibrators/g-spot-vibrators/sp-adam-eve-g-spot-touch-finger-vibe-100189.aspx?predictive=search%20autocomplete%3Eproduct%3EAdam%20%20Eve%20G-Spot%20Touch%20Finger%20Vibe.

* cited by examiner

*Primary Examiner* — Thaddeus B Cox
(74) *Attorney, Agent, or Firm* — Ellenoff Grossman & Schole LLP; John C. Stellabotte; Danielle Cohen

(57) ABSTRACT

The present disclosure is directed at a personal massager device having a body member substantially formed in the shape of a user finger to aid in user comfort and a non-straight internal cavity having an apex portion and a dimple portion to abut a substantial portion of a finger inserted into the cavity to substantially hold a user finger within the cavity and to prevent inadvertent dislodging of the inserted finger and the body member can include a bent distal phalange portion that positions a second end portion of the device at an angle that can enhance user stimulation and pleasure when in use.

20 Claims, 4 Drawing Sheets

PERSONAL MASSAGER

FIELD OF INVENTION

Embodiments of the present invention are in the field of stimulation devices. Specifically, embodiments of the present invention are related to personal massagers.

BACKGROUND

Marital or sexual aids (commonly referred to as "sex toys" or "stimulation devices") have been known and used for centuries by both men and women for the purpose of providing or achieving sexual pleasure, climax or orgasm, whether interpersonal or autoerotic. Generally, stimulation devices, for example, personal massagers, may be either used alone or with a partner.

Stimulation devices in the form of finger vibrators have been developed as a means to provide sexual stimulation. Personal, or finger vibrators are generally small devices adapted to receive a finger, and configured to vibrate at predetermined and/or selectable intervals. However, prior-developed finger vibrators lack a finger cavity formed to correspond to the natural shape of at least a portion of a finger and specifically configured to sufficiently hold a finger (e.g. substantially abut the circumference of a finger) during use and/or lack an exterior body design which substantially corresponds to the shape of a finger (e.g. having a tip extending from a bend or curved portion). For example, prior developed finger vibrators such as the Mini Marvels Marvelous Tickler Finger Vibe (https://www.adameve.com/vibrators/finger-vibrators/sp-mini-marvels-marvelous-tickler-finger-vibe-107497.aspx) lack a body member substantially formed in the shape of a standard human finger (including at least a bent phalange portion that can position the tip of the finger vibrator at an angle that can enhance stimulation and pleasure), and lack an internal cavity which is configured to substantially abut the circumference of a finger to hold an inserted finger substantially in place and prevent dislodgment of the personal massager when the massager is in use. Moreover, for example, the Adam & Eve G-Spot Touch Finger Vibe (https://www.adameve.com/adult-sex-toys/vibrators/g-spot-vibrators/sp-adam-eve-g-spot-touch-finger-vibe-100189.aspx?predictive=search%20autocomplete%3Eproduct%3EAdam%20%20Eve%20G-Spot%20Touch%20Finger%20Vibe) lacks a uniform body member configured to house all of the electronic components of the vibrator, including a motor, battery and actuation switch, and an internal cavity configured to substantially abut the circumference of a finger. In some scenarios, the personal massagers of the prior art fail because during use, such personal massagers lack a means of securing a finger inserted into the personal massager from becoming dislodged or slipping or sliding out of the internal cavity of such personal massagers, for example, after such personal massagers have been inserted into a user's body (e.g., a user's vagina). In some examples, the configurations of these prior-developed personal massager may fail because during use, a user's finger may slide out of the internal cavity, leaving the personal massager inside the user's body (e.g. inside a user's vagina).

Therefore, there exists a need for a personal massager device having a body member substantially formed in the shape of a user finger to aid in user comfort and an internal cavity adapted to abut a substantial portion of a finger inserted into the cavity to substantially hold a user finger within the cavity, to prevent inadvertent dislodging of the inserted finger. These and other features and advantages of the present invention will be explained and will become obvious to one skilled in the art through the summary of the invention that follows.

SUMMARY OF THE INVENTION

As described in further detail herein below, the methods and systems, and devices described herein employ a novel design for a personal massager, for example, a finger vibrator, comprising an internal cavity or channel configured to receive a finger and to support improved user grip to prevent unintended dislodgement of the personal massager. In some examples, the internal cavity or channel of the personal massager may be generally formed in the shape of a finger, including a bend or curve in the channel extending towards a dimple portion at an end of the channel, to substantially secure the personal massager around a finger of a user and prevent the unintended dislodgement of the personal massager, for example, during use of the personal massager.

In accordance with embodiments of the present invention, a personal massager may comprise a body member, an internal cavity or channel, a movement module, and a power module.

In accordance with embodiments of the present invention, the body member of the personal massager may be formed of a soft material, for example, a silicone material. In some examples, the soft material may be a soft plastic or rubber material. In some embodiments, the body member may be formed in the general shape of a finger, for example, with one or more bends and/or curves corresponding to natural bends or curves of a finger, for example, bends formed by the knuckles of a human finger. In some examples, the body member may include a portion corresponding to the base of a finger and a portion corresponding to a fingertip, with a bend placed in a predetermined location between the portion corresponding to the base of the finger and the portion corresponding to the fingertip.

In accordance with embodiments of the present invention, the internal cavity or channel of the personal massager may be configured to receive a user finger. In some embodiments, the cavity or channel may be configured to substantially correspond better to the natural shape of a finger, for example, to prevent unintended movement or dislodgement of a finger placed within the internal cavity or channel.

In accordance with embodiments of the present invention, the movement module of the personal massager may comprise a motor. In some examples, the motor may be configured with predetermined and/or selectable user settings configured to adjust movement settings of the personal massager, for example, vibration settings.

In accordance with embodiments of the present invention, the power module of the personal massager may comprise one or more batteries, for example, rechargeable batteries. In some embodiments, the power module may be operably connected to the movement module and may be configured to provide power to the movement module.

In accordance with embodiments of the present invention, the personal massager device may be configured to have the appearance of a natural finger, for example, a natural human finger, including bends or curves corresponding to knuckles of a human finger.

BRIEF DESCRIPTION OF THE DRAWINGS

Accompanying this written specification is a collection of drawings of exemplary embodiments of the present invention. One of ordinary skill in the art would appreciate that these are merely exemplary embodiments, and additional and alternative embodiments may exist and still be within the spirit of the invention as described herein.

DETAILED DESCRIPTION

Figure 1:
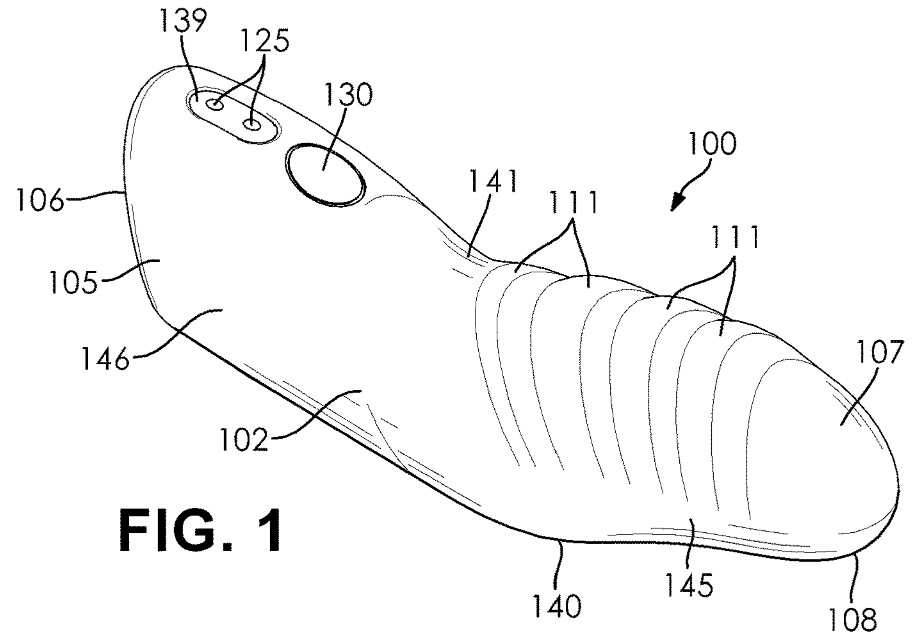
FIG. 1 depicts a bottom perspective view of a personal massager in accordance with an embodiment of the present invention.
Figure 2:
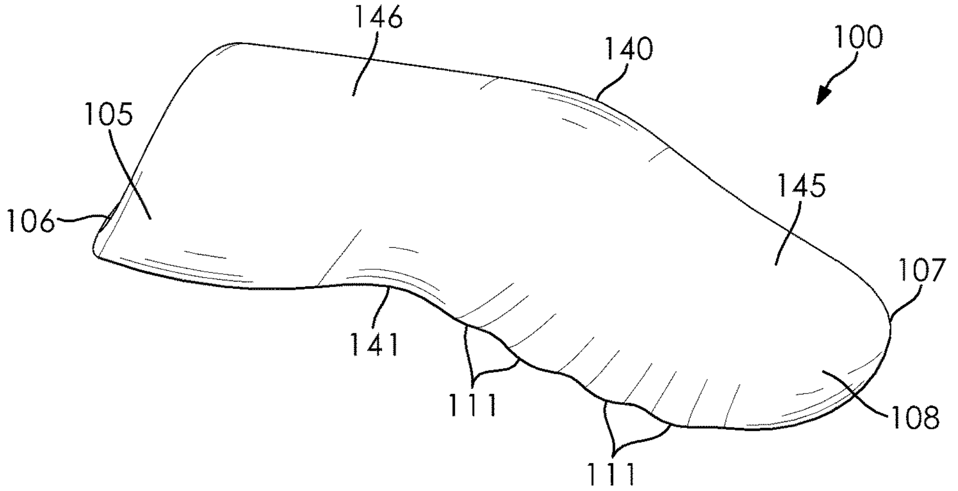
FIG. 2 depicts a top perspective view of a personal massager in accordance with an embodiment of the present invention.
Figure 3:
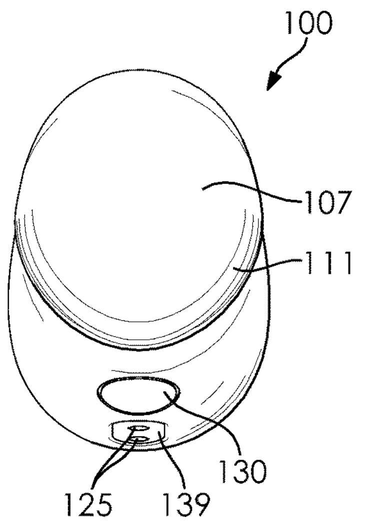
FIG. 3 depicts a front view of a personal massager in accordance with an embodiment of the present invention.
Figure 4:
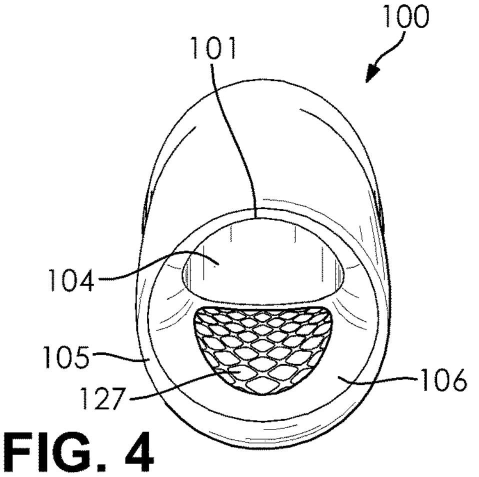
FIG. 4 depicts a rear view of a personal massager in accordance with an embodiment of the present invention.
Figure 5:
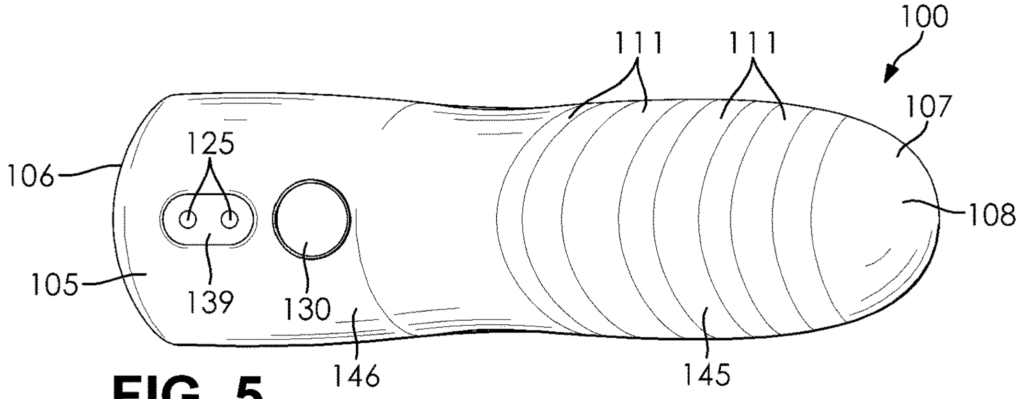
FIG. 5 depicts a bottom view of a personal massager in accordance with an embodiment of the present invention.
Figure 6:
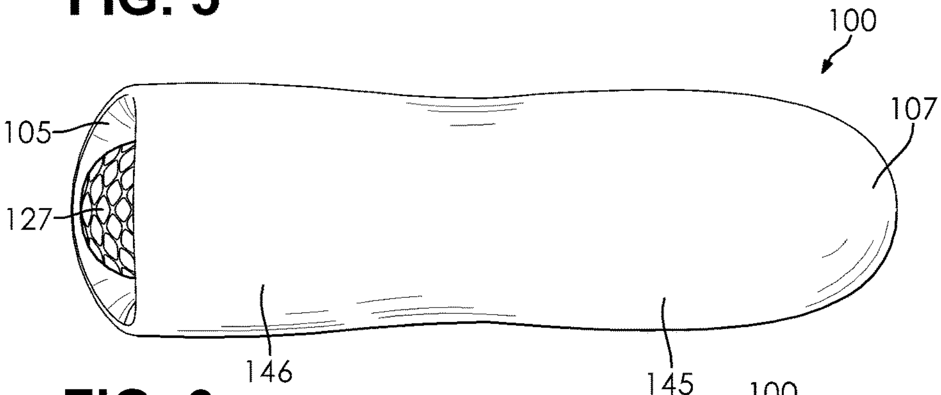
FIG. 6 depicts a top view of a personal massager in accordance with an embodiment of the present invention.
Figure 7:
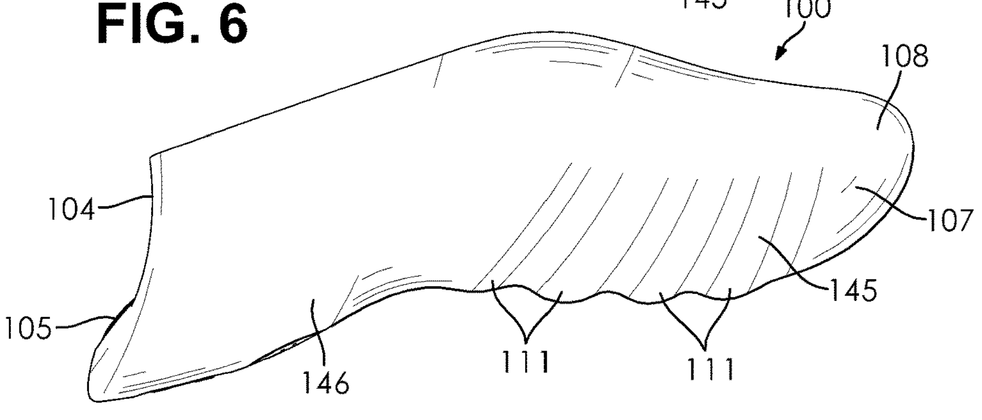
FIG. 7 depicts a side view of a personal massager in accordance with an embodiment of the present invention.

In the Summary above, the Detailed Description, the claims below, and in the accompanying drawings, reference is made to particular features (including method steps) of the present invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Whenever a reference herein is made to a method comprising two or more defined steps, the defined steps can be carried out in any order or simultaneously (except where the context excludes that possibility), and the method can include one or more other steps which are carried out before any of the defined steps, between two of the defined steps, or after all of the defined steps (except where context excludes that possibility).

The present invention is generally directed toward a personal massager, for example, a finger vibrator, comprising an internal cavity or channel configured to receive a finger and to support improved user grip to prevent unintended dislodgement of the personal massager. In some examples, the internal cavity or channel of the personal massager may be generally formed in the shape of a finger, including a bend in the channel extending towards a dimple portion at an end of the channel, to substantially secure the personal massager around a finger of a user and prevent the unintended dislodgement of the personal massager, for example, during use of the personal massager.

In accordance with embodiments of the present invention, a personal massager may comprise a body member, an internal cavity or channel, a movement module, and a power module. Some embodiments may include additional or fewer components, depending, for example, on the intended use of the personal massager.

In accordance with embodiments of the present invention, the body member of the personal massager may be formed of a soft plastic material, for example, a silicone material. In some embodiments, the body member may be formed in the general shape of a finger, for example, with one or more bends corresponding to natural bends of a finger. In some examples, the body member may include a portion corresponding to the base of a finger and a portion corresponding to a fingertip, with a bend placed in a predetermined location between the portion corresponding to the base of the finger and the portion corresponding to the fingertip. In some examples, the body member may be formed with a bent distal phalange portion. In some scenarios, the structure of the body member may include a bent distal phalange portion that positions the tip of the finger massager at an angle that can enhance stimulation and pleasure.

In accordance with embodiments of the present invention, the internal cavity or channel of the personal massager may be configured to receive a user finger. In some embodiments, the cavity or channel may be configured to substantially correspond to the natural shape of a finger, for example, to prevent unintended movement or dislodgement of a finger placed within the internal cavity or channel. In some examples, the internal cavity may be disposed within the body member of the personal massager, above a componentry housing configured to house at least a portion of the movement module and/or the power module.

In accordance with embodiments of the present invention, the internal cavity or channel in the body member may be specifically configured with predetermined dimensions. For example, the finger cavity entrance may be sloped to a particular degree, for example, sloped upwards at an acute angle from the horizontal, for example, any degree between 4°-20°, for example, 14° above the horizontal, for example, a horizontal line running through a side of the body member. In some examples, the internal cavity may include a bend portion formed at an end portion of the internal cavity which may substantially oppose an apex portion of the internal cavity. In any embodiment, the apex portion may be a portion or section of the internal cavity that is disposed within the body member at a position higher than the position of the opening or entrance of the internal cavity (e.g. at a position which is above the position of the opening or entrance of the internal cavity), and does not have to be an actual peak or apex. In some examples, the angle at the apex portion may be any degree between 90°-180°, for example, 149°. In some examples, the internal cavity begins at a first end which slopes upwards into the body member of the personal massager, towards the apex portion of the internal cavity, and from the apex portion slopes downwards towards a dimple portion at a second end of the internal cavity. In some examples, the angle at the dimple portion may be any degree between 90°-175°, for example, 171°. In any embodiment, the dimple portion does not necessarily have to be a precise dimple, it can be a gradual indent or depression within the internal cavity. In some scenarios, the combination of the apex portion and the dimple portion of the internal cavity function to secure a finger inserted into the internal cavity in place when the personal massager device is being utilized, for example, when the personal massager is inserted into a body cavity (e.g. a user's vagina).

In accordance with embodiments of the present invention, the movement module of the personal massager may comprise a motor. In some examples, the motor may be configured with predetermined and/or selectable user settings configured to adjust movement settings of the personal massager, for example, vibration settings. In some examples, the movement module may have a number of preselected vibration modes or settings. For example, the movement module may be programed with twenty preselected or predetermined modes. Some examples of vibration modes that may be provided are low and steady, followed by, for example, medium and steady, and/or high and steady. In some examples, the movement module may be provided with a number of unique vibration patterns. In some scenarios, the movement module may have a 'boost function' which may be configured to send the personal massager into the highest steady vibration for ten seconds no matter what mode the movement module is on. In some embodiments, the 'boost function' may be initiated by quickly double clicking or pressing the actuator button.

In accordance with embodiments of the present invention, the power module of the personal massager may comprise one or more batteries, for example, rechargeable batteries. In some embodiments, the power module may be operably connected to the movement module and may be configured to provide power to the movement module.

In some embodiments, the function of movement module may be controlled by a microcontroller unit (MCU), which may draw power from a power module (e.g. a power source). The power module may be a direct current (DC) power module. In some embodiments, the power module may be batteries, such as rechargeable batteries. For example, the power module may be lithium-ion (Li-ion) batteries or lithium polymer (Li-poly) batteries. However, in embodiments where the power module comprises batteries, the batteries can be other suitable types (e.g., lead acid, nickel cadmium, nickel metal hydride). In some embodiments, the power module may be a higher voltage alternating current (AC) source, coupled with a transformer, to bring the supplied power to acceptable DC voltage and current levels. In some embodiments, the power module may be capacitors. In any embodiment, the power module may be directed to be turned on or off by an actuator button or switch capable of starting or stopping to supply power to the power module.

In accordance with embodiments of the present invention, the power module may be charged and/or recharged by means of a charging station disposed on the body member, for example, charging pins, for example, one or more magnetized charging pins configured to magnetically connect to one or more corresponding magnetic pins on a charging wire. In some embodiments, the charging wire may be configured to magnetically connect to the charging pins disposed on the body member of the personal massager, and to charge and/or recharge the power module once the wire is connected to a power source (e.g. by means of an outlet or USB connection to a computing device). In some examples, the charging pins disposed on the body member may be flush with the surrounding surface of the body member. In some examples, this configuration may support easy and/or convenient cleaning of the body member. For example, the body member charging pins may be flush with the surrounding portions of the body member silicone material to make it less likely for germs, dirt and other unwanted materials to lodge into a crevice or opening wherein a charging station may be disposed on the body member and which may make it difficult or impossible to appropriately clean the charging station. In some examples, flush charging pins prevent germs, dirt and other unwanted materials from lodging into the charging station disposed on the body member of the personal massager.

In accordance with embodiments of the present invention, the personal massager may include an electronic module electronically connected to the one or more electrical energy storage devices. In some embodiments, the electronic module may include one or more of a control circuitry, a power receiver, and a battery charger for charging or providing power to one or more energy storage devices. In some embodiments, the control circuitry may be a controller circuit, MCU, or any similar controller apparatus. In some embodiments, the electronic module may have different or additional electronics. In some embodiments, a switch or button may be coupled to control circuitry for the toggling between vibration or power options.

In some embodiments, a power receiver may be electronically connected to the battery charger, which may be connected to the one or more energy storage devices that may then be electrically connected to the movement module through a controller circuit. In some embodiments, the control circuitry may be used to manage the charging of the one or more energy storage devices. In some embodiments, control circuitry may operate to manage the power delivered to the movement module.

In accordance with embodiments of the present invention, A personal massager device may comprise a body member having a first end and second end, with at least one curved portion disposed between the first and the second ends of the body member, comprising: a non-straight (e.g., sloped or having at least two slopes) internal cavity extending into the body member, a motor, a power source; a printed circuit board for transmitting vibrational data; and a componentry housing formed to encase at least a portion of the motor, the power source, and the printed circuit board. In some embodiments, the internal cavity may extend towards a mid-section of the body member to form a channel shaped to substantially correspond to a user finger. In some embodiments, the channel may slope downwards from the apex portion towards a dimple portion at a second end of the internal cavity. In some embodiments, the internal cavity may have a first end and a second end, with at least one curved portion disposed between the first and second ends of the internal cavity.

In accordance with embodiments of the present invention, A personal massager device may comprise: a body member formed of a soft material, having a first end and second end, with at least one curved portion disposed between the first and the second ends of the body member, and comprising: an internal cavity extending into the body member and having an opening disposed at the first end of the body member and extending upwards towards a mid-section of the body member to create a channel initiating at the opening, sloping upwards towards an apex portion disposed near the mid-section of the body member, and sloping downwards from the apex portion, a motor, a power source, a printed circuit board for transmitting vibrational data, and a componentry housing formed to encase at least a portion of the motor, the power source, and the printed circuit board. In some embodiments, the soft material may be a silicone material. In some examples, the soft material may be a rubber material. In some embodiments, the second end of the body member may include one or more ridges. In some embodiments, the internal cavity may comprise elastic or compliant internal side walls configured to stretch to substantially abut at least a portion of a user finger. In some embodiments, an exterior surface of the body member may include one or more magnetic charging pins in mechanical communication with the power source, each charging pin having a connector portion disposed on and being substantially flush with the exterior surface of the body member.

In accordance with embodiments of the present invention, a personal massager device may comprise: a body member formed of a soft material and having a first end which slopes upwards towards a curve formed near a mid-section of the body member and comprising: an opening extending into the body member to form an internal cavity having a first end which slopes upwards into the body member, towards a point past the mid-section of the body member to form an apex portion, and downwards from the apex portion towards a second end of the internal cavity to form a dimple portion at the second end of the internal cavity, a vibrational motor, a power source in mechanical communication with the motor and an actuator button, a printed circuit board for transmitting vibrational data in mechanical communication with the motor and the power source, and a componentry housing formed to encase the motor, the power source, and the printed circuit board. In some embodiments, the first end of the internal cavity may slope upward at a degree between 4°-20° above the horizontal. In some embodiments, the first end of the internal cavity may slope upwards at a degree of 14° above the horizontal. In some embodiments, the first end of the internal cavity may slope upward towards a bend or curve which substantially opposes the apex portion of the internal cavity. In some embodiments, the apex portion may have an angle between 90°-180°. In some embodiments, the apex portion may have an angle of 149°. In some embodiments, the internal cavity may comprise one or more elastic or compliant internal side walls configured to stretch to substantially abut at least a portion of a user finger. In some embodiments, an exterior surface of the body member may include one or more magnetic charging pins in mechanical communication with the power source, each charging pin having a connector portion disposed on and being substantially flush with the exterior surface of the body member.

Turning now to the FIGS. 1-9, generally shown is a personal massager in accordance with embodiments of the present invention. As shown in FIGS. 1-9, in some embodiments, a personal massager 100 may comprise a body member 102, an internal cavity 104, a first end portion 105 having a base portion 106, and a second end portion 107 having a bent distal phalange portion 108. In some embodiments, the base portion 107 may include an opening 101 which extends into the body member 102 to form the internal cavity 104. In some embodiments, the body member 102 may be substantially formed in the shape of a natural human finger, for example, including a distal phalange portion 145 and a medial phalange portion 146. In some embodiments, between the distal phalange portion 145 and medial phalange portion 146 of the body member 102 may be a bend comprising a top bend portion 140 and a bottom bend portion 141.

FIGS. 1-7 generally show perspective, front, rear, bottom, top and side views of an exemplary personal massager in accordance with embodiments of the present invention. As shown in FIGS. 1-7, in some examples, the bent distal phalange portion 108 of the body member 102 may include a textured portion or area at the second end 107 of the body member 102. In some examples, the textured portion may comprise one or more ridges 111. In some embodiments, the ridges 111 may be configured to increase user pleasure during use of the personal massager 100. Additionally or alternatively, the bent distal phalange portion 108 may be configured with other similarly suitable textured portions configured to increase user stimulation and pleasure during use of the personal massager 100. The textured portions may have any suitable configuration for that purpose, including alternating indents or protrusions in any suitable shape or pattern. In some embodiments, the body member 102 may include an actuator button 130 and a charging station 139 comprising one or more charging pins 125. As shown in the depicted example, in some embodiments, the actuator button 130 and/or the one or more charging pins 125 may be disposed at or near the first end 105 of the body member 102.

Figure 8:
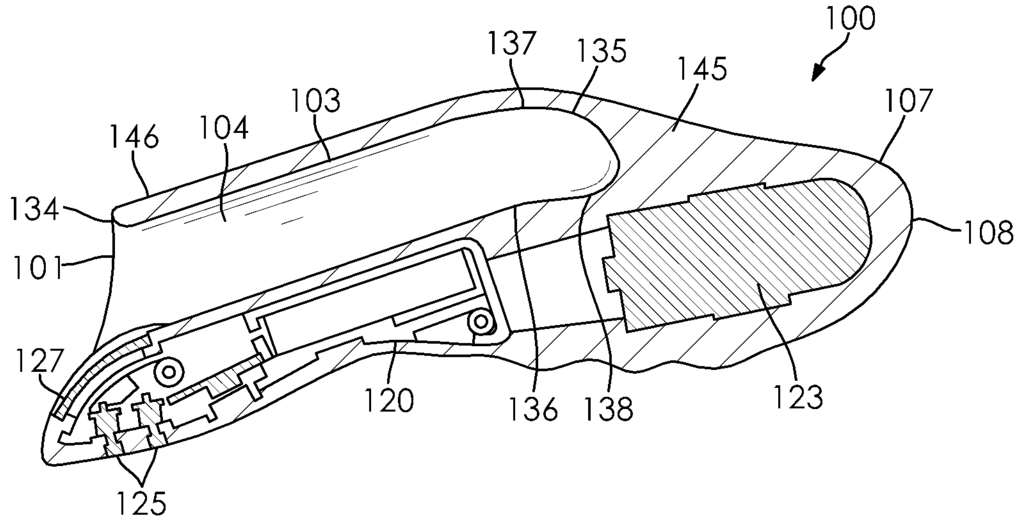
FIG. 8 depicts a cross-sectional view of a personal massager in accordance with an embodiment of the present invention.

FIG. 8 shows a cross-sectional view of an exemplary personal massager in accordance with embodiments of the present invention. As shown in in FIG. 8, the body member 102 may comprise a motor 123 operably connected to a power source 124, for example, a rechargeable battery, having one or more charging pins 125 extending therefrom or operably or mechanically connected thereto. In some examples, the body member 102 may include an internal cavity 104 adapted to engage at least a portion of a user finger. In some examples, the internal cavity 104 may be formed to abut at least a portion of a user finger e.g. one or more phalanges of a user finger. In at least some examples, the internal 104 may be formed and/or shaped to abut at least a distal phalange and a medial phalange. In some examples, the internal cavity 104 may abut each of a distal, medial and proximal finger phalanges.

In some scenarios, the internal cavity 104 may have a first end 134 and a second end 135. In some examples, at the first end 134 of the internal cavity 104 may be disposed an opening 101 configured as an entrance to the interior of the internal cavity 104. In some examples, the internal cavity opening or entrance 101 may be disposed at a first end 105 of the body member 102.

Figure 9:
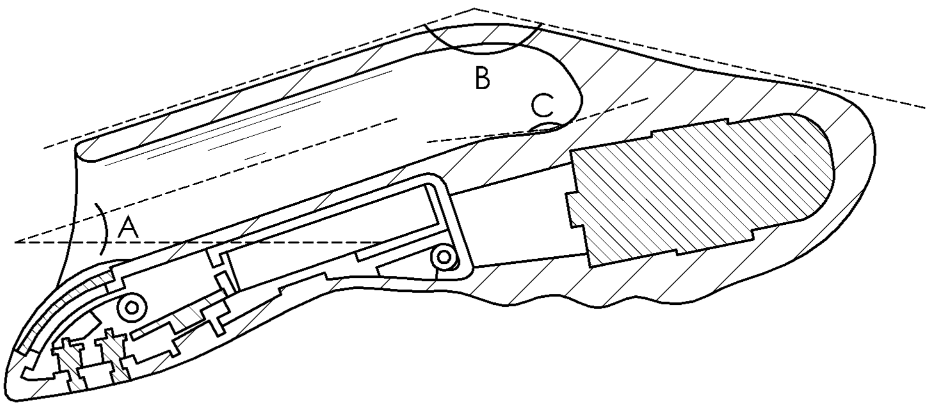
FIG. 9 depicts a cross-sectional view of a personal massager in accordance with an embodiment of the present invention.

As further shown in FIG. 8, in some embodiments, the internal cavity or channel 104 in the body member 102 of the personal massager 100 may be specifically configured with predetermined dimensions. For example, the internal cavity 104 may extend upwards from the opening of the internal cavity 104 towards a central portion of the body member 102. In some examples, the entrance of the internal cavity 104 may be sloped upwards to a particular degree. As shown in FIG. 9, the entrance of the internal cavity 104 may be sloped upwards at an acute angle A from the horizontal. In some examples, angle A may be any degree between 4°-20°, for example, 14° above a horizontal line running through a side of the body member 102. In some examples, the internal cavity 104 may include a bend 136 formed at or near a central or middle portion of the body member 102. In some examples, the bend 136 may substantially oppose an apex portion 137 of the internal cavity 104. As shown in the depicted example, in some embodiments the apex portion 137 may be a portion or section of the internal cavity 104 that is disposed within the body member 102 at a position higher than the position of the opening or entrance 101 of the internal cavity (e.g. at a position which is above the position of the opening or entrance 101 of the internal cavity 104), and does not have to be an actual peak or apex. As shown in FIG. 9, in some examples, the apex portion angle B may be any degree between 90°-180°, for example, 149°.

In accordance with embodiments of the present invention, the internal cavity 104 may have an opening 101 extending towards a channel having one or more interior side walls 103 configured to substantially abut at least a portion of a user finger. In some embodiments, the internal cavity 104 may begin at a first end which slopes upwards into the body member 102 of the personal massager 100, towards the apex portion 137 of the internal cavity 104, and from the apex portion 137 slopes downwards towards a dimple portion 138 at a second end 134 of the internal cavity 104. As shown in the illustrated example, in some embodiments the dimple portion may be a gradual indent or depression within the internal cavity. As shown in FIG. 9, in some embodiments the dimple portion angle C may be any degree between 90°-180°, for example, 171°.

In some examples, the dimple portion 138 may be formed of a substantially elastic or compliant material, for example, to provide "give" or the ability to press into the dimple portion 138 of the internal cavity 104. In some examples, this configuration may aid in user comfort and/or to secure a finger inserted into the internal cavity 104 in place when the personal massager device 100 is being utilized, for example, when the personal massager 100 is inserted into a body cavity (e.g., a user's vagina).

In some embodiments, the internal channel or cavity 104 may be formed of a substantially elastic or compliant material, for example, a soft silicone material configured to expand when a user finger is introduced into the internal cavity 104. In some examples, the soft material may be rubber, plastic, for example, thermoplastic elastomer (TPE) or thermoplastic rubber (TPR), jelly and/or any equivalents thereof. In some examples, the soft silicone material may be configured to abut at least a portion of a user finger. In some examples, the soft silicone material may be silicone. In some examples, the soft silicone material may have a static and/or kinetic coefficient of friction, sufficient to prevent a finger inserted into the internal cavity 104 from moving and/or dislodging the personal massager 100 from the finger.

Figure 10:
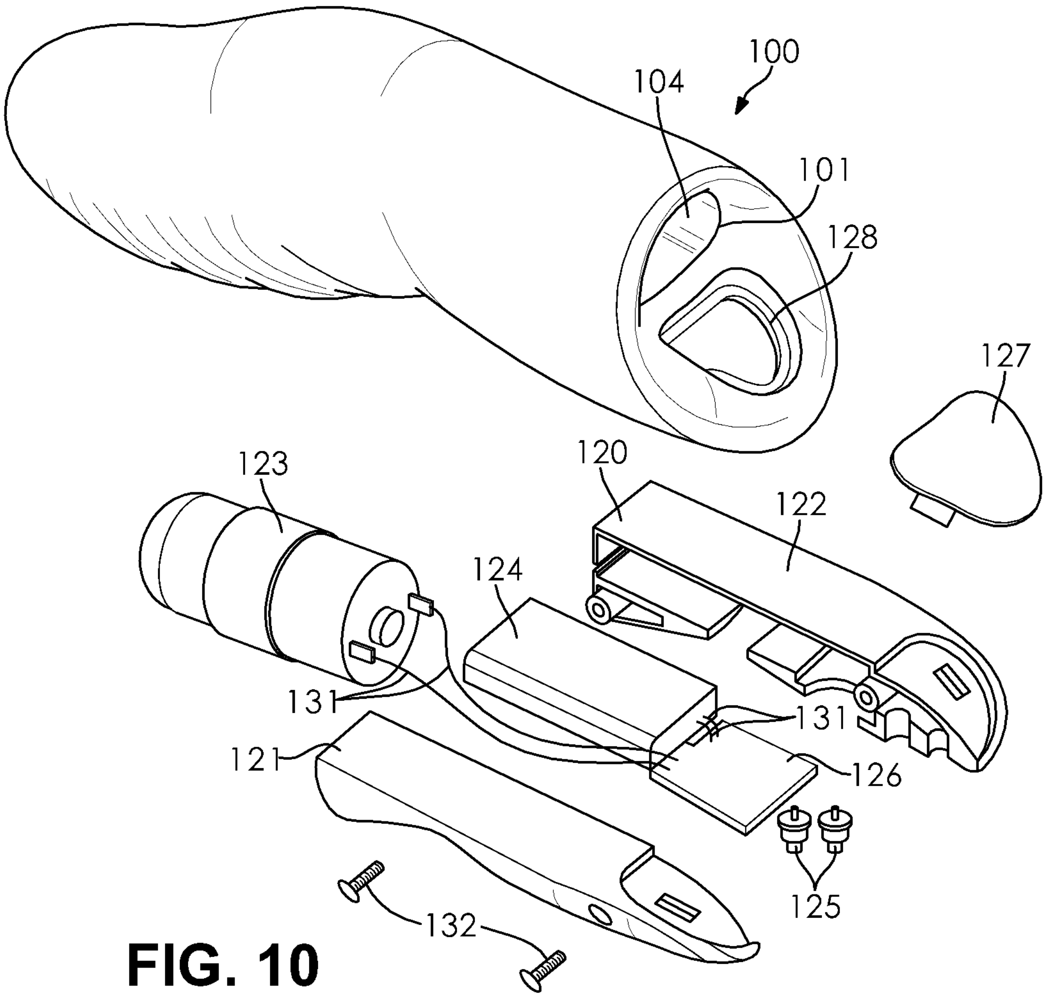
FIG. 10 depicts an exploded view of a personal massager in accordance with an embodiment of the present invention.

FIG. 10 shows an exploded view of an exemplary personal massager in accordance with embodiments of the present invention. As shown in FIG. 10, a personal massager 100 may comprise a body member 102, an internal cavity 104, a componentry housing 120, a printed circuit board (PCB) 126, and a motor 123 mechanically connected to a power source 124 operably and/or mechanically connected to one or more charging pins 125 disposed on or along an outer surface of the body member 102. In some examples, the housing may comprise a first housing member 121 and a second housing member 122. The first housing member 121 may connect to the second housing member 122, for example, by means of one or more adhesive members, for example, screws 132, to substantially contain at least a portion of the power source 124, the motor 124, and the PCB 126. In any embodiment, any similarly suitable adhesive members may be utilized to connect the first housing member 121 to the second housing member 122, for example, pins, glue, and other similarly suitable adhesives. In some examples, the componentry housing 120 may be a uniform member. In some examples, an external cover 127 may be configured to connect to and/or cover a portion of the componentry housing 120. In some examples, connection of the external cover 127 to the componentry housing 120 prevents the movement or dislodgment of the internal components within the componentry housing 120. In some examples, the connection of the external cover 127 may additionally or alternatively be configured to seal the device 100, to make the device substantially waterproof (e.g., 100% waterproof). In some examples, the body member 102 may include an aperture 128 configured to receive the external cover 127. In some examples, removal of the external cover 127 may provide access to the interior of the componentry housing 120. In some examples, the external cover 127 may be disposed at or near the first end 105 of the body member 102, for example, at the base portion 106 of the body member 102.

In accordance with embodiments of the present invention, the motor 123 may be configured to control the movement and/or vibration of at least the bent distal phalange portion 108 of the body member 102. In some examples, the motor 123 may control the movement and/or vibration of the one or more ridge members 111 disposed on the second end 107 or bent distal phalange portion 108 of the body member 102. In some examples, the motor 123 may be operably or mechanically connected to the PCB 126, for example, by means of one or more wires 131. In some examples, the PCB 126 may be operably or mechanically connected to the power source 124, for example, by means of one or more wires 131.

In accordance with an exemplary usage scenario, a user may insert a finger, for example, an index or middle finger into the internal cavity 104 of the body member 102 of the personal massager 100. In some embodiments, the distal phalange of a user finger may be disposed within the internal cavity, for example, at a dimple portion 138 disposed at a second end of the internal cavity 104. In some scenarios, a user's finger may rest or may be pressed against the dimple portion 138 of the internal cavity 104. In some scenarios, the internal cavity 104 may be configured to fit snugly around a user's finger, for example, around the circumference of a user's finger. In some scenarios, the interior side walls 103 of the internal cavity 104 may be configured to substantially abut at least a portion of a user's finger, for example, at least the finger tip of a user. In some scenarios, the combination of the apex portion 137 and the dimple portion 138 of the internal cavity 104 function to secure a finger inserted into the internal cavity 104 in place when the personal massager device 100 is being utilized, for example, when the personal massager 100 is inserted into a body cavity (e.g., a user's vagina). Note, this combination may be used with or without the bent distal phalange portion 108 that creates an angle for the second end 107 that can enhance stimulation and pleasure for the user. In some scenarios, the personal massager 100 may be powered on by the use of an actuator button 130, which may be disposed on an exterior surface of the body member 102. In some examples, a user may use the actuator button 130 to toggle between different user settings, for example, different vibration and/or movement settings.

In accordance with embodiments of the present invention, the motor 123 may be configured to control the movement and/or vibration of at least the bent distal phalange portion 108 of the body member 102. In some examples, the motor 123 may control the movement and/or vibration of the one or more ridge members 111 disposed on the second end 107 of the bent distal phalange portion 108 of the body member 102.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may have been omitted so as to not unnecessarily obscure the embodiments.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112(f). Specifically, any use of "step of" in the claims herein is not intended to invoke the provisions of 35 U.S.C. § 112(f).

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

The invention claimed is:

1. A personal massager device for single-finger encasement comprising:

a body member having a first end and second end, comprising:

a continuous, non-straight internal cavity extending into the body member and having an apex portion and a dimple portion, the internal cavity shaped to receive a single human finger;

a vibrational motor positioned within the body member, beneath the dimple portion of the internal cavity, and configured to generate vibratory stimulation;

a power source;

a printed circuit board for transmitting vibrational data; and a componentry housing formed to encase at least a portion of the motor, the power source, and the printed circuit board.

2. The personal massager device for single-finger encasement of claim 1, wherein the internal cavity extends towards a mid-section of the body member to form a channel shaped to substantially correspond to a single human finger and wherein at least one curved portion between the first and the second ends of the body member forms a bent distal phalange portion between the first and the second ends of the body member.

3. The personal massager device for single-finger encasement of claim 2, wherein the channel slopes downwards from the apex portion towards the dimple portion at a second end of the internal cavity.

4. The personal massager device for single-finger encasement of claim 1, wherein the internal cavity has a first end and a second end, with at least one curved portion disposed between the first and second ends of the internal cavity.

5. A personal massager device for single-finger encasement comprising:

a body member formed of a soft material, having a first end and second end, with at least one curved portion disposed between the first and the second ends of the body member to form a bent distal phalange portion, and comprising:

an internal cavity extending into the body member and having an opening disposed at the first end of the body member and extending upwards towards a mid-section of the body member to create a continuous channel for a single human finger initiating at the opening, sloping upwards towards an apex portion disposed near the mid-section of the body member, and sloping downwards from the apex portion towards a dimple portion;

a vibrational motor positioned beneath the dimple portion of the internal cavity within the body member and configured to generate vibratory stimulation at the bent distal phalange portion of the body member;

a power source;

a printed circuit board for transmitting vibrational data; and a componentry housing formed to encase at least a portion of the motor, the power source, and the printed circuit board.

6. The personal massager device for single-finger encasement of claim 5, wherein the internal cavity slopes upwards at a degree between 4° and 20° above a horizontal plane and the apex portion has an angle between 139° and 159°.

7. The personal massager device for single-finger encasement of claim 5, wherein the second end of the body member includes one or more ridges.

8. The personal massager device for single-finger encasement of claim 5, wherein the internal cavity comprises elastic or compliant internal side walls configured to stretch to substantially abut at least a portion of a single human finger.

9. The personal massager device for single-finger encasement of claim 5, wherein an exterior surface of the body member includes one or more magnetic charging pins in mechanical communication with the power source, each charging pin having a connector portion disposed on and being substantially flush with the exterior surface of the body member.

10. The personal massager device for single-finger encasement of claim 5, wherein a single human finger inserted in the internal cavity stays secure within the internal cavity when the personal massager is in use or inserted into a user.

11. A personal massager device for single-finger encasement comprising:

a body member formed of a soft material and having a first end which slopes upwards towards a curve formed near a mid-section of the body member to form a bend between the mid-section of the body member and a distal phalange portion of the body member and comprising:

an opening extending into the body member to form an internal cavity having a first end which slopes upwards into the body member, towards a point past the mid-section of the body member to form an apex portion, and downwards from the apex portion towards a second end of the internal cavity to form a dimple portion at the second end of the internal cavity, the internal cavity defining a continuous channel formed to correspond to a substantially extended single human finger;

a vibrational motor positioned beneath the dimple portion of the internal cavity within the body member and configured to generate vibratory stimulation at the distal phalange portion of the body member;

a power source in mechanical communication with the motor and an actuator button;

a printed circuit board for transmitting vibrational data in mechanical communication with the motor and the power source, and a componentry housing formed to encase the motor, the power source, and the printed circuit board.

12. The personal massager device for single-finger encasement of claim 11, wherein the first end of the internal cavity slopes upward at a degree between 4° and 20° above a horizontal plane.

13. The personal massager device for single-finger encasement of claim 11, wherein the first end of the internal cavity slopes upwards at a degree of 14° above a horizontal plane.

14. The personal massager device for single-finger encasement of claim 11, wherein the first end of the internal cavity slopes upward towards a bend or curve which substantially opposes the apex portion of the internal cavity.

15. The personal massager device for single-finger encasement of claim 11, wherein the apex portion has an angle between 90° and 180°.

16. The personal massager device for single-finger encasement of claim 11, wherein the apex portion has an angle of 149°.

17. The personal massager device for single-finger encasement of claim 11, wherein the dimple portion has an angle between 90° and 180°.

18. The personal massager device for single-finger encasement of claim 11, wherein the dimple portion has an angle of 171°.

19. The personal massager device for single-finger encasement of claim 11, wherein an exterior surface of the body member includes one or more magnetic charging pins in mechanical communication with the power source, each charging pin having a connector portion disposed on and being substantially flush with the exterior surface of the body member.

20. The personal massager device for single-finger encasement of claim 11, wherein the combination of the apex and the dimple portions of the internal cavity secures a single human finger inserted in the internal cavity within the internal cavity when the personal massager is in use or inserted into a user.

* * * * *